US012760922B2

(12) United States Patent
Degaonkar

(10) Patent No.: US 12,760,922 B2
(45) Date of Patent: Oct. 13, 2026

(54) FREEZE PROTECTION FOR WIRELESS HVAC SYSTEMS

(71) Applicant: Copeland Comfort Control LP, St. Louis, MO (US)

(72) Inventor: Amit Vijay Degaonkar, Maharashtra (IN)

(73) Assignee: Copeland Comfort Control LP, St. Louis, MO (US)

( * ) Notice: Subject to any disclaimer, the term of this patent is extended or adjusted under 35 U.S.C. 154(b) by 305 days.

(21) Appl. No.: 18/802,203

(22) Filed: Aug. 13, 2024

(65) Prior Publication Data

US 2026/0049735 A1 Feb. 19, 2026

(51) Int. Cl.

*H04L 41/0668* (2022.01)
*F24F 11/65* (2018.01)
*H04W 24/04* (2009.01)

(52) U.S. Cl.

CPC .......... *F24F 11/65* (2018.01); *H04L 41/0668* (2013.01); *H04W 24/04* (2013.01)

(58) Field of Classification Search

CPC ...... F24F 11/65; H04L 41/0668; H04W 24/04
See application file for complete search history.

(56) References Cited

U.S. PATENT DOCUMENTS

| | | | |
|---|---|---|---|
| 7,992,794 B2 | 8/2011 | Leen et al. | |
| 8,600,558 B2 | 12/2013 | Grohman | |
| 9,213,342 B2 | 12/2015 | Drake et al. | |
| 2013/0186613 A1 | 7/2013 | Estiban | |
| 2013/0213952 A1* | 8/2013 | Boutin ............... | G05D 23/1905 236/51 |
| 2014/0041846 A1* | 2/2014 | Leen .................. | G05D 23/1934 236/1 C |
| 2020/0149770 A1* | 5/2020 | Sinha .................... | H04W 76/10 |

* cited by examiner

*Primary Examiner* — Michael W Choi

(74) *Attorney, Agent, or Firm* — Harness, Dickey & Pierce, P.L.C.; Anthony G. Fussner

(57) ABSTRACT

An exemplary system includes a thermostat configured to be operable for communicating with an equipment interface module (EIM) for controlling operation of a heating/cooling unit. The thermostat is configured to be operable for communicating wirelessly (e.g., via 900 MHz communication protocol, other wireless communication protocol, etc.) with the equipment interface module. In the event of a wireless communication loss or failure, the thermostat is configured to be operable to failover to a wired connection between the thermostat and the equipment interface module to thereby enable wired communication between the thermostat and the equipment interface module, e.g., for controlling the heating/cooling unit to provide emergency heat in the event of the wireless communication loss or failure, etc.

24 Claims, 2 Drawing Sheets

FREEZE PROTECTION FOR WIRELESS HVAC SYSTEMS

FIELD

The present disclosure relates to freeze protection for wireless HVAC systems.

BACKGROUND

This section provides background information related to the present disclosure which is not necessarily prior art.

In a typical HVAC system, a thermostat controls the temperature of a space using a heating/cooling unit. The thermostat is installed in the space for controlling heating, ventilation, and air conditioning (HVAC) systems. Generally, the thermostat is a regulating device that performs actions in response to temperature sensed for the space in which the thermostat is installed so that the temperature of the space is maintained near a desired setpoint.

Traditionally, the thermostat controls the operation of the heating/cooling unit by communicating with the heating/cooling device through wired 24V AC signals. In more modern HVAC systems, the 24V wired signal communication between the thermostat and the heating/cooling unit has been updated with wireless communication technology, such as Bluetooth Low Energy (BLE) or Sub-GHz systems. These wireless HVAC systems are particularly useful where wired connections are not feasible due to wire damage or insufficient wiring to support new HVAC devices.

The requirement for heating or cooling may thus be wirelessly transmitted from the thermostat to the heating/cooling unit over a wireless network. The necessary transmitter and receiver for the wireless network can be integrated directly into the thermostat and the heating/cooling unit. Or the necessary transmitter and receiver for the wireless network may be provided as an add-on module, which may also be referred to as an equipment interface module (EIM).

DRAWINGS

The drawings described herein are for illustrative purposes only of selected embodiments and not all possible implementations, and are not intended to limit the scope of the present disclosure.

Figure 1:
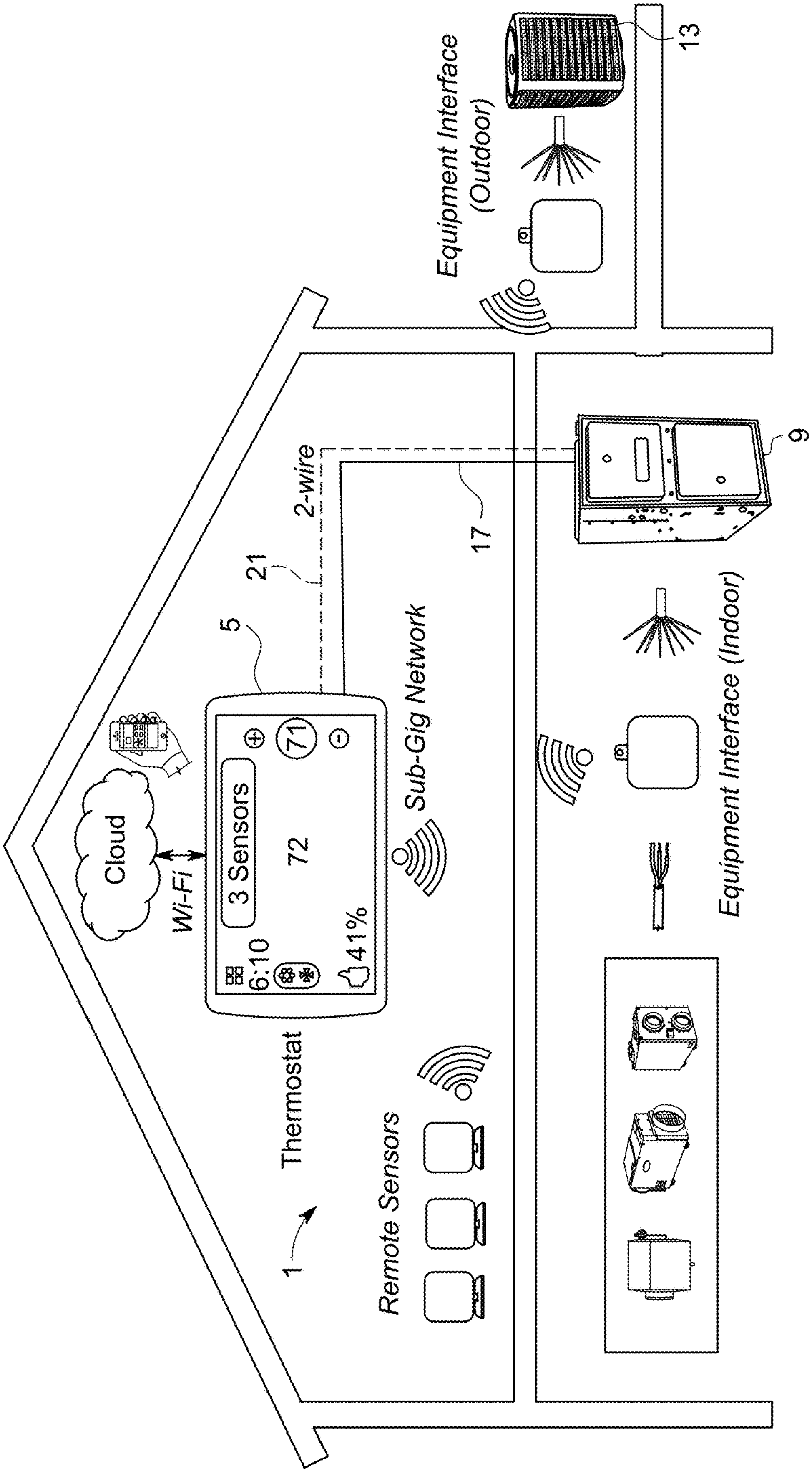

FIG. 1 represents a conventional wireless HVAC system in which a thermostat is configured to be operable for wirelessly communicating with an indoor device (e.g., a furnace, etc.) and an outdoor device (e.g., a heat pump, etc.) over a wireless network. As shown in FIG. 1, only two existing wires from a prior system are reused to provide a wired connection only between the thermostat and the indoor device.

Figure 2:
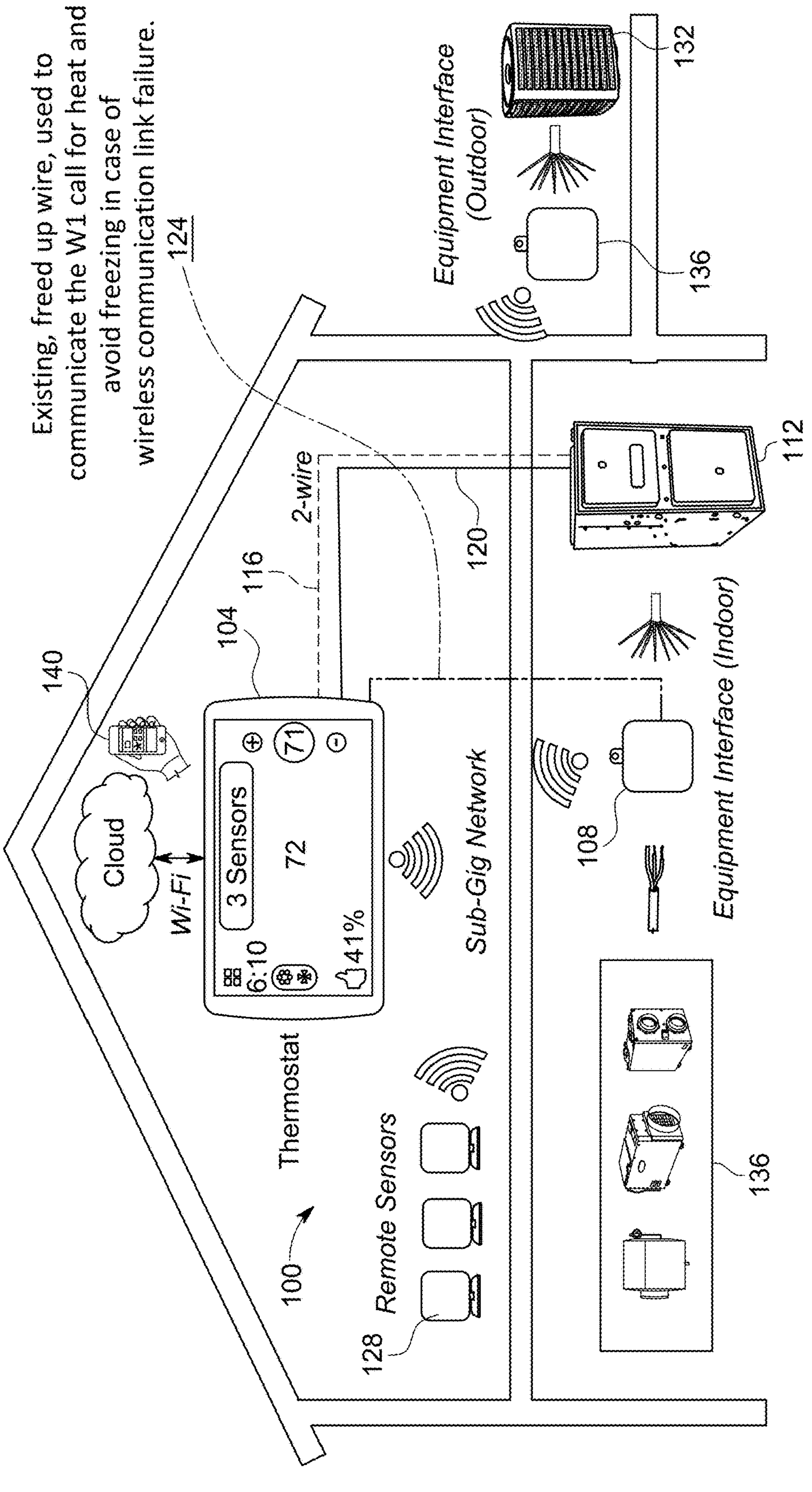

FIG. 2 represents an exemplary embodiment of an HVAC system including a thermostat (broadly, first controller) configured to be operable for communicating with an equipment interface module (broadly, second controller) for controlling operation of an indoor heating/cooling unit (broadly, HVAC system component) via a wireless network or via a wired connection in response to a wireless communication loss or failure between the thermostat and the equipment interface module. As shown in FIG. 2, three existing wires from a prior system are reused. More specifically, two existing wires are reused to provide a wired connection between the thermostat and the indoor device (e.g., a furnace, etc.). The third existing wire is reused to provide a wired "failover" connection between the thermostat and the equipment interface module.

DETAILED DESCRIPTION

Example embodiments will now be described more fully with reference to the accompanying drawings.

As noted above in the background, an add-on module or equipment interface module (EIM) may include a transmitter and receiver for a wireless network through which a thermostat may wirelessly send commands for controlling operation of an indoor heating/cooling unit. Wireless systems may be generally preferred as it can be time consuming and/or costly to install wiring for a thermostat and switching devices for establishing connection of a voltage source to the heating/cooling unit via the wiring.

Even though wireless systems may be generally preferred, there is a possibility of a failure or loss of the wireless connection between the thermostat and the heating/cooling unit via the equipment module interface. As recognized herein, the failure or loss of the wireless connection can lead to a non-operative heating/cooling unit even when there is a need for heating/cooling. And this can be especially problematic when there is a critical need for heat during freezing weather but the non-operative heating/cooling unit is unable to receive the wireless calls for heat from the thermostat, which lack of heat may then lead to serious property damage, endanger human life, etc.

After recognizing the above, exemplary embodiments were developed and/or are disclosed herein for providing freeze protection for HVAC systems. In exemplary embodiments, a thermostat (broadly, first controller) is configured to be operable for communicating with an equipment interface module (broadly, second controller) for controlling operation of an indoor heating/cooling unit (broadly, HVAC system component). The thermostat may be configured to be operable for communicating wirelessly (e.g., via 900 MHz communication protocol, other wireless communication protocol, etc.) with the equipment interface module for controlling operation of the indoor heating/cooling unit, which is coupled with the equipment interface module. In the event of a wireless communication loss or failure, the thermostat is configured to be operable to automatically failover to a wired connection between the thermostat and the equipment interface module to thereby enable wired communication between the thermostat and the equipment interface module, e.g., for controlling the indoor/heating unit to provide emergency heat in the event of the wireless communication loss or failure, etc.

In exemplary embodiments, an existing wire (e.g., one of the three existing wires from a prior system, etc.) may be freed up and reused to provide a wired connection between the thermostat and the equipment interface module, which wired connection may then be used in the event of a wireless communication failure. In response to the loss or failure of the wireless communication, the thermostat would automatically failover to the wired connection and send a signal to the equipment interface module over the wire. In response to receiving the thermostat signal over the wire, the equipment interface module controls operation of the indoor heating/cooling unit to thereby activate a heating cycle (e.g., an emergency heating mode to provide freeze protection for the HVAC system, etc.).

In exemplary embodiments, three wires may be connected with the thermostat including first and second wires connected with the thermostat for electrical power and a third wire connected to the thermostat for enabling wired communication for emergency heat in response to a wireless communication loss or failure.

Exemplary embodiments may be configured such that the thermostat will only fail over to the wired connection and only send W1 calls for heat over the wired connection in response to the loss or failure of the wireless communication. Advantageously, exemplary embodiments may be configured to be relatively easily installed or implemented for providing an emergency heat mode in response to the loss or failure of the wireless communication.

In exemplary embodiments, the thermostat is configured to be operable for communicating wirelessly via 900 MHz communication protocol with the equipment interface module for controlling operation of the indoor heating/cooling unit coupled with the equipment interface module. Advantageously, the use of the 900 MHz communication protocol makes it unlikely that there will be a wireless communication loss or failure between the thermostat and the equipment module interface. Accordingly, such exemplary embodiments may allow for the elimination of the need for a return air temperature sensor configured to output a signal indicative of a temperature of return airflow within the heating/cooling unit, such as a return air temperature sensor disclosed in U.S. Pat. No. 9,213,342 which is incorporated herein by reference.

FIG. 1 represents a conventional wireless HVAC system 1 in which a thermostat 5 is configured to be operable for wirelessly communicating with an indoor device 9 (e.g., a furnace, etc.) and an outdoor device 13 (e.g., a heat pump, etc.) over a wireless network. As shown in FIG. 1, only two existing wires 17, 21 from a prior system are reused to provide a wired connection only between the thermostat 1 and the indoor device 9.

FIG. 2 represents an exemplary embodiment of an HVAC system 100 including a thermostat 104 (broadly, a controller) configured to be operable for communicating with an equipment interface module 108 for controlling operation of an indoor heating/cooling unit 112 via a wireless network or via a wired connection in response to a wireless communication loss or failure between the thermostat 104 and the equipment interface module 108. As shown in FIG. 2, three existing wires 116, 120, 124 from a prior system are reused. More specifically, two existing wires 116 and 120 are reused to provide a wired connection between the thermostat 104 and the indoor device 112 (e.g., a furnace, etc.). The third existing wire 124 is reused to provide a wired "failover" connection between the thermostat 104 and the equipment interface module 108. Accordingly, the third existing wire 124 is freed up and reused to provide a wired connection between the thermostat 104 and the equipment interface module 108, which wired connection may then be used in the event of a wireless communication failure.

Also shown in FIG. 2 are remote temperature sensors 128, an outdoor device 132 (e.g., heat pump, etc.), and indoor unit(s) 140 (e.g., air handler(s), etc.). The thermostat 104 may be configured to be operable for wirelessly communicating with the outdoor device 132 (e.g., a heat pump, etc.) over a wireless network via an outdoor equipment interface 140. The thermostat 104 may also be configured to be operable for wirelessly communicating with the indoor unit(s) 140 (e.g., air handler(s), etc.) over a wireless network via the indoor equipment interface 108.

The remote temperature sensors 128 are configured to wirelessly communicate signals indicative of air temperature within the space in which they are installed. The remote temperature sensors 128 may be configured to sense temperature and transmit signals or values representative of the sensed temperatures of area(s) within the space. The remote temperature sensors 128 may be battery powered and wirelessly transmits information over the wireless network. The remote temperature sensors 128 may transmit temperature information on a periodic basis or upon sensing a minimum change in sensed temperature to reduce the number of transmission signals and prolong battery life.

The thermostat 104 (broadly, first controller) includes a receiving device configured to receive wirelessly transmitted signals from the remote temperature sensors 128. For example, the thermostat 104 may receive (from a remote temperature sensor 128) a wirelessly transmitted signal with information indicative of sensed temperature, such as a frequency having a value that corresponds to a temperature value. The thermostat 104 may be configured to compare a working sensed temperature to a setpoint temperature and responsively generate a command signal to activate the heating/cooling unit to control the temperature in the space relative to a set-point temperature.

The thermostat 104 may be used in combination with a user interface device 140. The user interface device 140 may be a mobile device (e.g., a smartphone, etc.) that contains a software application designed to interface with the thermostat 104 (e.g., a Wi-Fi enabled smart thermostat, etc.) through wireless communication with the thermostat 104. The user interface device 140 is preferably configured to wirelessly transmit a user-selected set point temperature to the thermostat 104 for heating or cooling operation.

As recognized herein, multiple pre-existing, nondamaged wires will become redundant automatically (e.g., Y1, Y2, W1, W2, G, O/B, etc.) when the traditional wired connections between the heating/cooling devices are changed from wired to wireless. Even if one of the redundant wires is reused to replace a damaged 24V power wire, at least two additional wires should still be available. One of these two additional wires can then be reused to establish a wired connection between the thermostat and the heating/cooling unit. In exemplary embodiments disclosed herein, one or more of the redundant readily available wires are used to enable the thermostat to communicate a W1 call for heat to the equipment interface module via the wired connection to thereby have the equipment interface module activate a heating cycle by the heating/cooling unit. This will ensure continued operation of the HVAC system (thermostat and heating/cooling unit) in case of a wireless connection failure.

In exemplary embodiments, the equipment interface module is configured (e.g., via firmware and/or software, etc.) to monitor the call status through the wireless interface as well as the wired interface. For example, the equipment interface module may be configured (e.g., via firmware and/or software, etc.) to be operable for deciding whether to consider either or both of wired interface information and/or wireless interface information when controlling operation of the heating/cooling unit. When there is an established wireless connection between the equipment interface module and the thermostat, the equipment interface module will use and rely upon the information received via the wireless interface to decide call operation for the heating/cooling unit. But in response to a loss or failure of the wireless connectivity between the equipment interface module and the thermostat, the equipment interface module will then use and rely upon information from the wired interface to decide call operation for the heating/cooling unit.

In exemplary embodiment, the wired interface may be relatively non-complex for allowing the equipment interface module to control operation of one heating/cooling unit. Or additional intelligence may be added to the wired interface to encode more information, such as the total number of stages to be operated and/or whether an outdoor device should be operated as well.

In an alternative exemplary embodiment, the wireless communication between the thermostat and equipment interface module may be removed completely. In which case, the wired connection using the redundant wire may be used to communicate different call demands from the thermostat to the equipment interface module. And the thermostat may be configured with the capability to communicate different types of signals to indicate different call/stage requirements to the equipment interface module. The equipment interface module may then be operable to decipher the call data from the thermostat and operate the indoor heating/cooling unit via the traditional interface, which may be exposed and easily accessible to the installer.

Disclosed are exemplary methods of providing freeze protection for an HVAC system including a thermostat, a heating/cooling unit, and an equipment interface module. In exemplary embodiments, the method comprises configuring the equipment interface module and the thermostat to be operable for controlling operation of the heating/cooling unit via: wireless communication between the thermostat and the equipment interface module over a wireless network; and a wired connection between the thermostat and the equipment interface module in response to a wireless communication loss or failure between the thermostat and the equipment interface module.

In exemplary embodiments, the method includes configuring the equipment interface module and the thermostat to automatically fail over to the wired connection in response to the wireless communication loss or failure between the thermostat and the equipment interface module, thereby enabling the thermostat to communicate a call for heat over the wired connection to the equipment interface module for activating a heating cycle by the heating/cooling unit.

In exemplary embodiments, the method includes configuring the equipment interface module and the thermostat to automatically fail over to the wired connection in response to the wireless communication loss or failure between the thermostat and the equipment interface module, thereby enabling the thermostat to communicate a call for heat over the wired connection to the equipment interface module for activating an emergency heating mode by the heating/cooling unit for providing freeze protection for the HVAC system.

In exemplary embodiments, the method includes configuring the equipment interface module and the thermostat to automatically fail over to the wired connection in response to the wireless communication loss or failure between the thermostat and the equipment interface module for communicating only calls for heat from the thermostat over the wired connection to the equipment interface module for controlling heating operation of the heating/cooling unit.

In exemplary embodiments, the method includes configuring the equipment interface module to monitor call status through the wireless network and the wired connection such that the equipment interface module is operable for deciding whether to consider either or both of information received via the wired connection and/or information received via the wireless network when controlling operation of the heating/cooling unit.

In exemplary embodiments, the method includes configuring the equipment interface module such that: when there is an established wireless connection between the equipment interface module and the thermostat, the equipment interface module is operable for using information received via the wireless network to decide call operation for the heating/cooling unit; and when there is a wireless communication loss or failure between the equipment interface module and the thermostat, the equipment interface module is operable for using information received via the wired connection to decide call operation for the heating/cooling unit.

In exemplary embodiments, the method includes configuring the thermostat and the equipment interface module to communicate wirelessly via the 900 MHz communication protocol for controlling operation of the heating/cooling unit.

In exemplary embodiments, the method includes reusing an existing wire from a prior HVAC system to provide the wired connection between the thermostat and the equipment interface module.

In exemplary embodiments, the method includes connecting first and second wires with the thermostat for electrical power. The method also includes connecting a third wire with the thermostat and the equipment interface module for enabling wired communication between the thermostat and the equipment interface module in the event of a wireless communication loss or failure between the thermostat and the equipment interface module. The first, second, and third wires may be existing wires from a prior wired HVAC system that was replaced with the wireless HVAC system.

Also disclosed are exemplary methods of operating a heating/cooling unit for providing freeze protection for a HVAC system. In exemplary embodiments, the method comprises controlling operation of the heating/cooling unit via: wireless communication between a thermostat and an equipment interface module over a wireless network; and a wired connection between the thermostat and the equipment interface module in response to a wireless communication loss or failure between the thermostat and the equipment interface module.

In exemplary embodiments, the method includes automatically failing over to the wired connection in response to the wireless communication loss or failure between the thermostat and the equipment interface module. The method may also include communicating a call for heat from the thermostat over the wired connection to the equipment interface module for activating a heating cycle by the heating/cooling unit. For example, the method may include communicating a call for heat from the thermostat over the wired connection to the equipment interface module for activating an emergency heating mode by the heating/cooling unit for providing freeze protection for the HVAC system.

In exemplary embodiments, the method includes automatically failing over to the wired connection in response to the wireless communication loss or failure between the thermostat and the equipment interface module. And the method may include communicating only calls for heat from the thermostat over the wired connection to the equipment interface module for controlling heating operation of the heating/cooling unit.

In exemplary embodiments, the method includes monitoring call status, via the equipment interface module, through the wireless network and the wired connection for deciding whether to consider either or both of information received via the wired connection and/or information received via the wireless network when controlling operation of the heating/cooling unit.

In exemplary embodiments, the method includes: when there is an established wireless connection between the equipment interface module and the thermostat, using information received via the wireless network to decide call operation for the heating/cooling unit; and when there is a wireless communication loss or failure between the equipment interface module and the thermostat, using information received via the wired connection to decide call operation for the heating/cooling unit.

In exemplary embodiments, the method includes the thermostat communicating wirelessly with the equipment interface module via the 900 MHz communication protocol for controlling operation of the heating/cooling unit.

Exemplary embodiments are also disclosed of systems for controlling operation of heating/cooling units for providing freeze protection for HVAC system. In exemplary embodiments, the system comprises a thermostat and an equipment interface module. The equipment interface module and the thermostat are configured to be operable for controlling operation of the heating/cooling unit via: wireless communication between the thermostat and the equipment interface module over a wireless network; and a wired connection between the thermostat and the equipment interface module in response to a wireless communication loss or failure between the thermostat and the equipment interface module.

In exemplary embodiments, the equipment interface module and the thermostat are configured to automatically fail over to the wired connection in response to the wireless communication loss or failure between the thermostat and the equipment interface module, thereby enabling the thermostat to communicate a call for heat over the wired connection to the equipment interface module for activating a heating cycle by the heating/cooling unit.

In exemplary embodiments, the equipment interface module and the thermostat are configured to automatically fail over to the wired connection in response to the wireless communication loss or failure between the thermostat and the equipment interface module, thereby enabling the thermostat to communicate a call for heat over the wired connection to the equipment interface module for activating an emergency heating mode by the heating/cooling unit for providing freeze protection for the HVAC system.

In exemplary embodiments, the equipment interface module and the thermostat are configured to automatically fail over to the wired connection in response to the wireless communication loss or failure between the thermostat and the equipment interface module for communicating only calls for heat from the thermostat over the wired connection to the equipment interface module for controlling heating operation of the heating/cooling unit.

In exemplary embodiments, the equipment interface module is configured to monitor call status through the wireless network and the wired connection such that the equipment interface module is operable for deciding whether to consider either or both of information received via the wired connection and/or information received via the wireless network when controlling operation of the heating/cooling unit.

In exemplary embodiments, the equipment interface module is configured such that: when there is an established wireless connection between the equipment interface module and the thermostat, the equipment interface module is operable for using information received via the wireless network to decide call operation for the heating/cooling unit; and when there is a wireless communication loss or failure between the equipment interface module and the thermostat, the equipment interface module is operable for using information received via the wired connection to decide call operation for the heating/cooling unit.

In exemplary embodiments, the thermostat and the equipment interface module are configured to communicate wirelessly via the 900 MHz communication protocol for controlling operation of the heating/cooling unit.

Advantageously, exemplary embodiments disclosed herein may thus solve the problem of loss of heating/cooling in case of wireless communication loss. Exemplary embodiments may ensure reliable operation of an HVAC system in general and heating/cooling units in particular irrespective of wireless communication status without compromising on the wired redundancy.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. For example, when permissive phrases, such as “may comprise”, “may include”, and the like, are used herein, at least one embodiment comprises or includes the feature(s). As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of providing freeze protection for an HVAC system including a thermostat, a heating/cooling unit, and an equipment interface module, the method comprising configuring the equipment interface module and the thermostat to be operable for controlling operation of the heating/cooling unit via:

wireless communication between the thermostat and the equipment interface module over a wireless network; and a wired connection between the thermostat and the equipment interface module in response to a wireless communication loss or failure between the thermostat and the equipment interface module.

2. The method of claim 1, wherein the method includes configuring the equipment interface module and the thermostat to automatically fail over to the wired connection in response to the wireless communication loss or failure between the thermostat and the equipment interface module, thereby enabling the thermostat to communicate a call for heat over the wired connection to the equipment interface module for activating a heating cycle by the heating/cooling unit.

3. The method of claim 1, wherein the method includes configuring the equipment interface module and the thermostat to automatically fail over to the wired connection in response to the wireless communication loss or failure between the thermostat and the equipment interface module, thereby enabling the thermostat to communicate a call for heat over the wired connection to the equipment interface module for activating an emergency heating mode by the heating/cooling unit for providing freeze protection for the HVAC system.

4. The method of claim 1, wherein the method includes configuring the equipment interface module and the thermostat to automatically fail over to the wired connection in response to the wireless communication loss or failure between the thermostat and the equipment interface module for communicating only calls for heat from the thermostat over the wired connection to the equipment interface module for controlling heating operation of the heating/cooling unit.

5. The method of claim 1, wherein the method includes configuring the equipment interface module to monitor call status through the wireless network and the wired connection such that the equipment interface module is operable for deciding whether to consider either or both of information received via the wired connection and/or information received via the wireless network when controlling operation of the heating/cooling unit.

6. The method of claim 1, wherein the method includes configuring the equipment interface module such that:

when there is an established wireless connection between the equipment interface module and the thermostat, the equipment interface module is operable for using information received via the wireless network to decide call operation for the heating/cooling unit; and when there is a wireless communication loss or failure between the equipment interface module and the thermostat, the equipment interface module is operable for using information received via the wired connection to decide call operation for the heating/cooling unit.

7. The method of claim 1, wherein the method includes configuring the thermostat and the equipment interface module to communicate wirelessly via the 900 MHz communication protocol for controlling operation of the heating/cooling unit.

8. The method of claim 1, wherein the method includes reusing an existing wire from a prior HVAC system to provide the wired connection between the thermostat and the equipment interface module.

9. The method of claim 1, wherein the method includes:
- connecting first and second wires with the thermostat for electrical power; and
- connecting a third wire with the thermostat and the equipment interface module for enabling wired communication between the thermostat and the equipment interface module in the event of a wireless communication loss or failure between the thermostat and the equipment interface module.

10. The method of claim 9, wherein the first, second, and third wires are existing wires from a prior wired HVAC system that was replaced with the wireless HVAC system.

11. The method of claim 1, wherein the method includes the thermostat communicating wirelessly with the equipment interface module via the 900 MHz communication protocol for controlling operation of the heating/cooling unit.

12. A method of operating a heating/cooling unit for providing freeze protection for a HVAC system, the method comprising controlling operation of the heating/cooling unit via:
- wireless communication between a thermostat and an equipment interface module over a wireless network; and
- a wired connection between the thermostat and the equipment interface module in response to a wireless communication loss or failure between the thermostat and the equipment interface module.

13. The method of claim 12, wherein the method includes:
- automatically failing over to the wired connection in response to the wireless communication loss or failure between the thermostat and the equipment interface module; and
- communicating a call for heat from the thermostat over the wired connection to the equipment interface module for activating a heating cycle by the heating/cooling unit.

14. The method of claim 12, wherein the method includes:
- automatically failing over to the wired connection in response to the wireless communication loss or failure between the thermostat and the equipment interface module; and
- communicating a call for heat from the thermostat over the wired connection to the equipment interface module for activating an emergency heating mode by the heating/cooling unit for providing freeze protection for the HVAC system.

15. The method of claim 12, wherein the method includes:
- automatically failing over to the wired connection in response to the wireless communication loss or failure between the thermostat and the equipment interface module; and
- communicating only calls for heat from the thermostat over the wired connection to the equipment interface module for controlling heating operation of the heating/cooling unit.

16. The method of claim 12, wherein the method includes monitoring call status, via the equipment interface module, through the wireless network and the wired connection for deciding whether to consider either or both of information received via the wired connection and/or information received via the wireless network when controlling operation of the heating/cooling unit.

17. The method of claim 16, wherein the method includes:
- when there is an established wireless connection between the equipment interface module and the thermostat, using information received via the wireless network to decide call operation for the heating/cooling unit; and
- when there is a wireless communication loss or failure between the equipment interface module and the thermostat, using information received via the wired connection to decide call operation for the heating/cooling unit.

18. A system for controlling operation of a heating/cooling unit for providing freeze protection for a HVAC system, the system comprising a thermostat and an equipment interface module, wherein the equipment interface module and the thermostat are configured to be operable for controlling operation of the heating/cooling unit via:
- wireless communication between the thermostat and the equipment interface module over a wireless network; and
- a wired connection between the thermostat and the equipment interface module in response to a wireless communication loss or failure between the thermostat and the equipment interface module.

19. The system of claim 18, wherein the equipment interface module and the thermostat are configured to automatically fail over to the wired connection in response to the wireless communication loss or failure between the thermostat and the equipment interface module, thereby enabling the thermostat to communicate a call for heat over the wired connection to the equipment interface module for activating a heating cycle by the heating/cooling unit.

20. The system of claim 18, wherein the equipment interface module and the thermostat are configured to automatically fail over to the wired connection in response to the wireless communication loss or failure between the thermostat and the equipment interface module, thereby enabling the thermostat to communicate a call for heat over the wired connection to the equipment interface module for activating an emergency heating mode by the heating/cooling unit for providing freeze protection for the HVAC system.

21. The system of claim 18, wherein the equipment interface module and the thermostat are configured to automatically fail over to the wired connection in response to the wireless communication loss or failure between the thermostat and the equipment interface module for communicating only calls for heat from the thermostat over the wired connection to the equipment interface module for controlling heating operation of the heating/cooling unit.

22. The system of claim 18, wherein the equipment interface module is configured to monitor call status through the wireless network and the wired connection such that the equipment interface module is operable for deciding whether to consider either or both of information received via the wired connection and/or information received via the wireless network when controlling operation of the heating/cooling unit.

23. The system of claim 18, wherein the equipment interface module is configured such that:
- when there is an established wireless connection between the equipment interface module and the thermostat, the equipment interface module is operable for using information received via the wireless network to decide call operation for the heating/cooling unit; and when there is a wireless communication loss or failure between the equipment interface module and the thermostat, the equipment interface module is operable for using information received via the wired connection to decide call operation for the heating/cooling unit.

24. The system of claim 18, wherein the thermostat and the equipment interface module are configured to communicate wirelessly via the 900 MHz communication protocol for controlling operation of the heating/cooling unit.

* * * * *